United States Patent [19]

Koyama

[11] Patent Number: 4,984,250
[45] Date of Patent: Jan. 8, 1991

[54] DC TERMINATION CIRCUIT FOR SUBSCRIBER CABLES

[75] Inventor: Tetsu Koyama, Tokyo, Japan

[73] Assignee: NEC Corporation, Japan

[21] Appl. No.: 298,475

[22] Filed: Jan. 18, 1989

[30] Foreign Application Priority Data

Jan. 19, 1988 [JP] Japan .................................. 63-11375

[51] Int. Cl.⁵ ............................................. H04B 3/00
[52] U.S. Cl. ................................. 375/36; 178/69 R; 307/540
[58] Field of Search .................. 375/36, 94; 340/825.5, 340/825.52; 178/68, 69 D, 71 R, 69 R; 307/260, 270, 363, 540

[56] References Cited

U.S. PATENT DOCUMENTS

| | | | |
|---|---|---|---|
| 3,302,035 | 1/1967 | Greene | 375/36 |
| 3,949,168 | 4/1976 | Taub | 178/68 |
| 4,423,506 | 12/1983 | Kawasaki et al. | 340/825.52 |
| 4,443,882 | 4/1984 | Rolfe et al. | 375/36 |
| 4,639,936 | 1/1987 | Hogan et al. | 178/79 D |
| 4,726,034 | 2/1988 | Schillhof et al. | 178/71 R |
| 4,766,402 | 8/1988 | Crane | 375/36 |
| 4,775,864 | 10/1988 | Herman | 340/825.5 |
| 4,823,364 | 4/1989 | Herzog | 375/36 |

Primary Examiner—Douglas W. Olms
Assistant Examiner—Stephen Chin
Attorney, Agent, or Firm—Laff, Whitesel, Conte & Saret

[57] ABSTRACT

A DC termination circuit is provided for keeping a sealing current on a subscriber line during normal operation in order to prevent an oxidation of contacts in said line. The termination circuit is coupled across the line in response to the normal relatively high line voltage. In order to test the line, especially for its electrostatic capacitance, the line voltage is switched off and a relatively low voltage is applied through test equipment to the line. Responsive thereto, the termination circuit is removed from the line to terminate the sealing current.

6 Claims, 2 Drawing Sheets

DC TERMINATION CIRCUIT FOR SUBSCRIBER CABLES

BACKGROUND OF THE INVENTION

The present invention relates to a communication system for digital data transmission via subscriber cables, and more particularly to a DC termination circuit for use in such a communication system.

Where data terminal equipment (DTE) and subscriber cables are connected to each other at contact points to achieve data transmission via the cables, the surfaces of the contact points are known to sometimes become oxidized and gather rust with the lapse of time. This rust would in no way affect the transmission of analog signals, such as speech signals, via the subscriber cables. However, if data are directly transmitted via the cables, an increase in resistance due to the rust will invite data errors and thereby obstruct transmission of accurate data. By the prior art, in order to prevent the occurrence of such rust, a DC termination circuit consisting of a resistor is connected to the contact points, and a DC current known as a sealing current is supplied to this resistor from the central station.

The conventional DC termination circuit referred to above, merely consisting of a resistor for termination, involves the problem that, in the event of communication trouble or the like, it is difficult to check from the central station to determine whether there is any abnormality on the cable. More specifically, abnormality checking is tried from the central station by measuring the resistance and the electrostatic capacitance of the cables. The resistance can be measured without removing the DC termination circuit; the capacitance cannot be so checked. Accordingly, there is the great trouble, and consequently the inconvenience for practical use, of having to disconnect the DC termination circuit every time the capacitance is to be measured.

SUMMARY OF THE INVENTION

An object of the present invention, therefore, is to solve the above stated problem and provide a DC termination circuit which permits ready line testing from the central station.

According to the invention, a DC termination circuit is positioned between a subscriber terminal and a pair of subscriber cables in a communication system for digitally transmitting data from the subscriber terminal via the pair of subscriber cables. The present termination circuit comprises a termination resistor connected to one of the paired subscriber cables. The termination circuit also comprises a parallel-connected circuit including a voltage-sensitive element which, connected in series to the termination resistor, is off when the voltage does not exceed a prescribed level and is turned on when the voltage does exceed the prescribed level, and a switch connected in parallel to the voltage-sensitive element. The switch is controlled by a switch driving circuit, of which one end is connected to the parallel-connected circuit and the other end is connected to the other of the paired subscriber cables.

BRIEF DESCRIPTION OF THE DRAWINGS

The above and other objects, features and advantages of the present invention will become apparent from the following detailed description when taken with the accompanying drawings in which.

DETAILED DESCRIPTION OF THE PREFERRED EMBODIMENT

Figure 1:
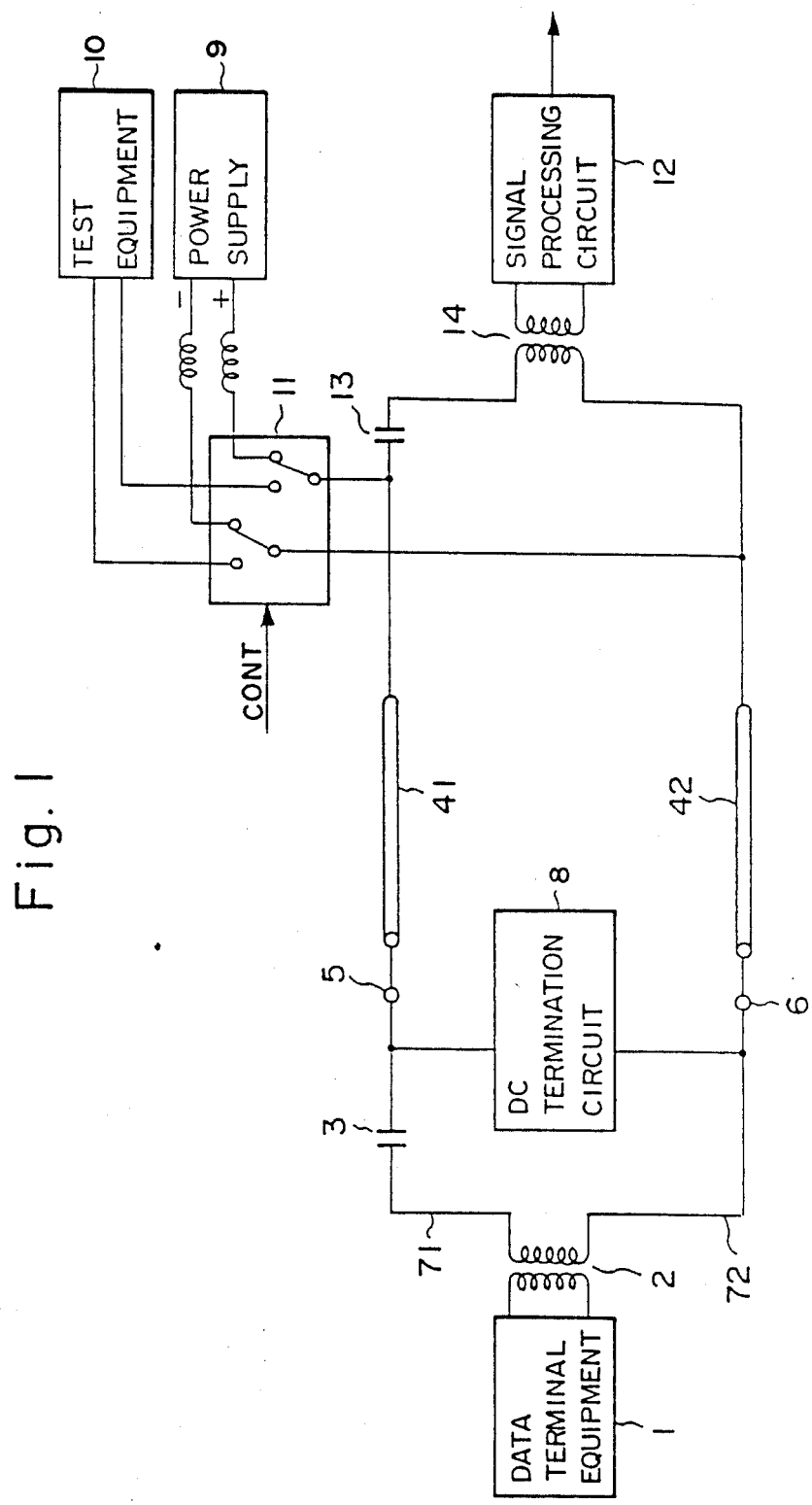
FIG. 1 is a block diagram illustrating a communication system to which the invention is applied.

FIG. 1 is a block diagram illustrating a communication system to which the invention is applied. In the figure, data terminal equipment (DTE) 1 is connected to terminals or contact points 5 and 6 via a transformer 2, a DC cutting capacitor 3 and connecting lines 71 and 72. At one end subscriber cables 41 and 42 are connected to the connecting lines 71 and 72 via the terminals 5 and 6. A DC termination circuit 8 is connected between the connecting lines 71 and 72 in order to prevent an increase in resistance due to rust developing where the connecting lines and the subscriber cables are connected to each other. Meanwhile the other ends of the subscriber cables 41 and 42 are connected, on the station side, to a power supply unit 9 and line test equipment 10 via a switch 11. This switch 11, as will be described below, normally selects the power supply unit 9 to supply a sealing current to the termination circuit 8, and selects the test equipment 10 when the subscriber cables are to be tested. The turning-over of this switch 11 is accomplished by a control signal from a control circuit not shown.

The ends of the subscriber cables 41 and 42 on the station side are also connected to a signal processing circuit 12 via a capacitor 13 and a transformer 14 to process data signals from the subscriber's DTE 1.

Figure 2:
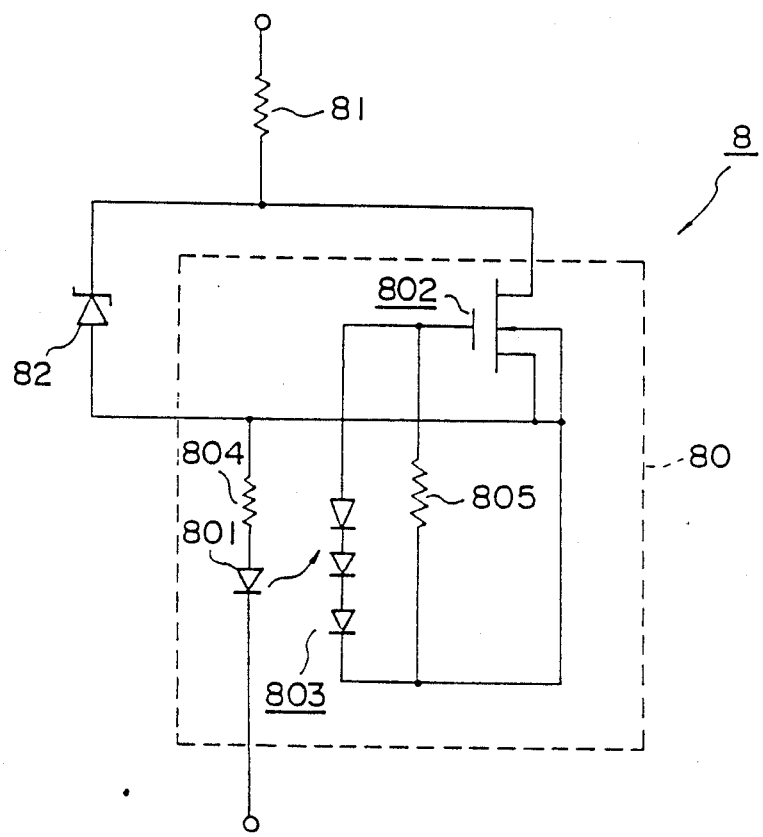
FIG. 2 is a circuit diagram illustrating a preferred embodiment of the invention.

FIG. 2 is a diagram illustrating a DC termination circuit of the present invention. In the figure, the termination circuit 8 comprises a termination resistor 81, a Zener diode 82 connected in series to the resistor 81 and a solid state relay (SSR) 80 connected to the resistor 81 and the Zener diode 82. The SSR 80 further comprises a light emitting diode (LED) 801 connected in series with the Zener diode 82, and a switch 802 connected in parallel to the Zener diode 82. The SSR 80 also includes a field effect transistor (FET), a photodiode array 803 responsive to light from the LED 801 for generating a voltage to drive the switch 802, and a resistor 804, which is a current-controlled resistor for the diode 801. No further description of the SSR 80 will be made herein, because it may, for instance, be the circuit described in the U.S. Pat. No. 4,268,843 which is incorporated by reference.

Next will be described the operation of the DC termination circuit with reference to FIGS. 1 and 2. The switch 11 (FIG. 1) normally selects the power supply unit 9 on the station side, and supplies the subscriber cables 41 and 42 with a voltage which is higher than the Zener voltage of the diode 82. The Zener diode 82 is turned on by this voltage from the power supply unit 9. A current is thereby caused to flow to the LED 801. The photodiode array 803 generates a driving voltage as to close the switch 802 in response to light from the LED 801. This switch closing decreases the current flowing to the Zener diode 82 so as to turn off the Zener diode 82. As a result, the termination resistor 81 is connected to the subscriber cables 41 and 42, and supplied with the sealing current from the power supply unit 9.

The voltage from the power supply unit 9, the Zener voltage and the resistances of the resistors 804 and 81 are respectively selected so as to let a sufficient current flow to the LED 801 to actuate the switch 802 via the photodiode array 803.

Meanwhile, a disconnection of the termination resistor 81 from the cables 41 and 42 is achieved by operating switch 11 to sever the power supply circuit 9 from the cables with the switch 11. An alternative way to disconnect the resistor 81 is to sufficiently decrease the current of the LED 801 to make the switch 802 unable to keep itself closed by decreasing the voltage from the power supply unit 9. By the second method as well, the switch 802 can be opened to disconnect the termination resistor 81 from the subscriber cables.

As hitherto described, the present invention makes it possible to connect the termination resistor to, and to disconnect it from, the subscriber cables with a simple circuit configuration and thereby to permit ready testing of the subscriber cables.

What is claimed is:

1. A DC termination circuit to be positioned between a subscriber terminal and a pair of subscriber cables in a communication system for digitally transmitting data from said subscriber terminal via said pair of subscriber cables, comprising:
   termination resistor means connected to one of said paired subscriber cables;
   a parallel-connected circuit including voltage-sensitive means which, connected in series to the termination resistor means, is off when the voltage does not exceed a prescribed level and is turned on when said voltage does exceed the prescribed level, and switching means connected in parallel with the voltage-sensitive means; and
   switch driving means, of which one end is connected to the parallel-connected circuit and the other end is connected to the other of said paired subscriber cables, for controlling said switching means.

2. A DC termination citcuit, as claimed in claim 1, wherein said switch means and said switch driving means is formed of solid state relays.

3. A DC termination circuit, as claimed in claim 1, wherein said voltage-sensitive means consists of a Zener diode.

4. A DC termination circuit to be positioned between a subscriber terminal and a pair of subscriber cables in a communication system for digitally transmitting data from said subscriber terminal via said pair of subscriber cables, comprising:
   termination resistor means connected to one of said paired subscriber cables;
   a parallel-connected circuit including voltage-sensitive means which is connected in series to the termination resistor means, said voltage-sensitive means being off when the voltage does not exceed a prescribed level and being on when said voltage does exceed the prescribed level, and switching means being connected with parallel to the voltage-sensitive means, said switching means comprising a field effect transistor; and
   switch driving means, having one end connected to the parallel-connected circuit and the other end connected to the other of said paired subscriber cables for controlling said switching means, said switch driving means comprising a light emitting diode and a photodiode array responsive to light from the light emitting diode for generating a control voltage for controlling said field effect transistor.

5. A DC termination circuit for subscriber lines having end terminal switch are normally supplied with a sealing current for preventing a deterioration of resistance at said terminals, said termination circuit comprising means normally connected across a subscriber line for enabling said sealing current to appear on said line, voltage controlled switching means for selectively coupling said termination circuit to apply said sealing current responsive to a relatively high voltage on said line, a resistor coupled in a series circuit with a zener diode that conducts when in the presence of said high voltage, said series circuit being coupled across said subscriber line to carry said sealing circuit, electronic switch means coupled in parallel with said zener diode to switch on and latch in an on condition responsive a conductivity of said zener diode, said switched on electronic switch shunting said zener diode to switch it off, said electronic switch means comprising a transistor having a control electrode, a light emitting diode coupled in series with said zener diode, and light responsive means coupled to said control electrode to apply a switching on potential thereto responsive to light emitted by said light emitting diode, means responsive to a relatively low voltage on said line for operating said switching means to effectively remove said termination circuit in order to terminate said sealing current, and means responsive to said relatively low voltage on said line for switching off said switching means and thereby terminate said sealing current.

6. The terminating circuit of claim 5 and a power supply, test means, said relatively high voltage being the line voltage applied from said power supply to said subscriber line, and said relatively low voltage being a voltage applied to said line via said test means, and switch means for disconnecting said line voltage from and connecting said test means to said line in order to switch off said electronic switch.

* * * * *